United States Patent [19]

Adcock

[11] 4,415,972
[45] Nov. 15, 1983

[54] DUAL PORT MEMORY INTERLOCK

[75] Inventor: Ralph L. Adcock, Irvine, Calif.

[73] Assignee: Sperry Corporation, New York, N.Y.

[21] Appl. No.: 220,300

[22] Filed: Dec. 29, 1980

[51] Int. Cl.³ .................... G06F 15/16; G06F 13/00
[52] U.S. Cl. ................................................ 364/200
[58] Field of Search ... 364/200 MS File, 900 MS File

[56] References Cited

U.S. PATENT DOCUMENTS 4,065,809 12/1977 Matsomoto ................... 304/200

Primary Examiner—Gareth D. Shaw
Assistant Examiner—D. K. Dorsey
Attorney, Agent, or Firm—G. Donald Weber, Jr.; Eugene T. Battjer

[57] ABSTRACT

There is provided a circuit which automatically selects one or the other of at least two contending processor circuits and selectively grants the selected processor circuit access to an exchange memory in a regulated and prioritized manner.

5 Claims, 2 Drawing Figures

DUAL PORT MEMORY INTERLOCK

BACKGROUND

1. Field of the Invention

This invention is directed to computer systems, in general, and to computer systems which include a plurality of processor circuits which utilize a common memory unit or device, in particular.

2. Prior Art

There are many known computer systems available to the art. Typically, the computer systems are designed to achieve optimum operating characteristics which characteristics vary as the art improves. The optimum designs include various alterations in terms of the operation, the speed, the throughput, and the like, generally in an attempt to maximize the system operation relative to the cost thereof.

The maximization of operation versus cost is frequently a trade-off in one or more parameters. In some occasions, the trade-off is in the hardware versus firmware (software) applications. That is, sometimes greater use is made of the firmware or software while in other applications greater use is made of hardware, especially dedicated hardware.

Also, in many systems arrangements are made wherein a plurality of processor units are utilized. The processors may be central processing units (CPU's) or they may be other processors such as micro-processors, mini-computers or the like. By utilizing a plurality of these processing units, different capabilities of different processors can be utilized together. In addition, processors having different word lengths (16-bits, 8-bits, or the like) can be utilized in a single system. This permits greater flexibility in operating parameters and characteristics.

However, it has typically been a problem that utilization of more than one processor requires extensive software interconnections or control in order to assure that the appropriate processor is functioning at the appropriate time. This has created the problem that extensive memory or software operations are required which reduces the other operating parameters of the overall system. In addition, the software application is usually such that a relatively slow operation occurs. That is, it is required that the software produce a checking function to determine which processor is in operation, then a selection operation to select which processor should be in operation, and then other housekeeping or administrative controls to assure that the appropriate processor is functioning at the appropriate time and the other processor is not improperly operating, and so forth. This software control is, as noted, relatively slow and uses up much of the system memory.

SUMMARY OF THE INVENTION

The circuit of the instant invention provides a hardware control apparatus for properly selecting one or the other of a plurality of processors which are contending for access to a single exchange memory unit. The selection is achieved so that only one processor is actually connected to the exchange memory and the other processor is positively excluded from access to the exchange memory. In particular, one of the processors normally has priority and is connected to the memory via the interlock control unless the other processor has taken control of the interlock and has positively excluded the first processor. The second processor must actually seek control of the interlock apparatus and can only obtain this control if the first (or priority) processor has not already exlcuced the second processor.

In essence, a memory is provided which can be accessed by one or more processors on a selective basis. The selection or connection to the memory is effected through a multiplexer (MUX). The multiplexer is controlled by an interlock circuit which is controlled by signals from the respective processors along respective data busses associated with the respective processors.

DESCRIPTION OF A PREFERRED EMBODIMENT

Figure 1:
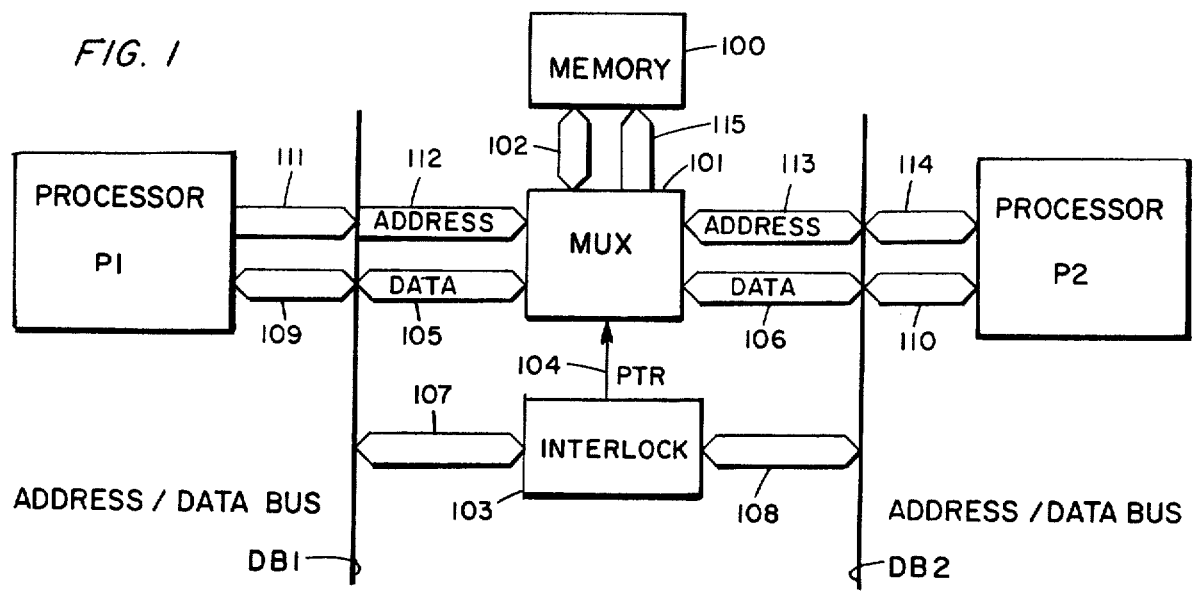
FIG. 1 is a schematic block diagram of the system of the instant invention.

Referring now to FIG. 1, there is shown a block diagram of a preferred embodiment of the instant invention. In this embodiment, a memory 100 is depicted. This memory can be a scratch pad or exchange memory of any suitable configuration. Typically, memory 100 is a random access memory (RAM).

A multiplexer 101 (MUX) performs functionally as a switching means and is connected to memory 100 via bidirectional memory bus 102 and unidirectional bus 115. Bidirectional bus 102 permits data to be exchanged between the memory 100 and MUX 101. Bus 115 is used to select the address of the memory location by MUX 101. MUX 101 is connected to interlock circuit 103 by means of the pointer bus 104. The interlock circuit 103 provides a pointer signal (PNTR) along bus 104 which signal selectively controls the operation of MUX 101.

MUX 101 is connected to address/data bus DB1 via address transfer bus 112 and data transfer bus 105, respectively. The bus 105 is a bidirectional bus wherein data can be transmitted either from bus DB1 to the MUX 101 or from the MUX to the data bus. Conversely, address bus 112 is unidirectional to transfer address information from the DB1 bus to MUX 101.

Similarly, MUX 101 is connected to address/data bus DB2 via address transfer bus 113 and data transfer bus 106. In this instance, bus 113 and bus 106 are both bidirectional busses.

In addition, the interlock circuit 103 is connected to the data busses DB1 and DB2 via the interlock busses 107 and 108. Busses 107 and 108 are also bidirectional busses which permit information to be transferred from the respective data busses to the interlock circuit and vice versa.

Processor P1 is connected to address data bus DB1 via processor address bus 111 and processor data bus 109 while processor P2 is connected to data bus DB2 by address bus 114 and processor data bus 110. Processor busses 109, 110 and 114 are each bidirectional wherein data or address information can be transferred from the respective data bus to the respective processor or vice versa. Conversely, bus 111 is a unidirectional bus for supplying address information to the address/data bus DB1.

In operation, one of the processors is identified and assigned priority. In this instance, the priority is assigned to processor P2. Thus, if interlock 103 is not overtly locked to processor P1, as described hereinafter, processor P2 is connected to memory 100 via MUX 101 and the respective data transfer busses 102, 106 and 110 as well as data bus DB2 and the respective address busses 113, 114 and 115. In order for processor P1 to gain access to memory 100, processor P1 has to obtain control over the interlock 103 by writing a bit (typically a binary "1") into the interlock via bus 107. Processor P1 then "reads" the interlock circuit 103 to determine if the binary 1 was actually written therein. In the event that the binary 1 was not written into the interlock circuit 103 by processor P1 because processor P2 is already in control of interlock 103, processor P1 proceeds with other activity which does not require access to memory 100. Processor P1 will then return at a later time to repeat this process until a binary 1 is actually written into interlock 103 by processor P1. Meanwhile, processor P2 is connected to memory 100 and is able to function in any desired fashion with regard thereto.

When processor P2 has completed its operation relative to memory 100, processor P2 resets the interlock circuit which provides processor P1 the opportunity to write (and also read) by binary 1 into the interlock 103. When this occurs, the pointer 104 directs the MUX 101 to connect the memory 100 and processor P1 via the appropriate data busses 102, 105, 109 and data bus DB1 as well as the address busses 111, 112 and 115. At the same time, processor P2 is now locked out of contact with memory 100 via MUX 101. At this time, processor P1 is now in contact with memory 100 and can access this memory to perform whatever functions are appropriate. When processor P1 has performed the appropriate function, the interlock circuit is switched wherein processor P2 can now access memory 100, to the exclusion of processor P1, if processor P2 is so inclined. Conversely, if processor P2 does not take control of the interlock circuit 103, processor P1 can return and take control of the interlock circuit and, therefore, access memory 100 to the exclusion of processor P2.

Thus, either of the processors can, in theory, access exchange memory 100 at any time. However, the processors cannot concurrently interact with memory 100. Therefore, inappropriate action or operation of the respective processors is prevented. However, processor P2 effectively has control (or priority of control) over memory 100 as a function of the operation of interlock circuit 103. On the other hand, with the appropriate signal conditions, including surrendering of the pointer by processor P2, processor P1 can take control of the circuit and perform its desired functions.

Figure 2:
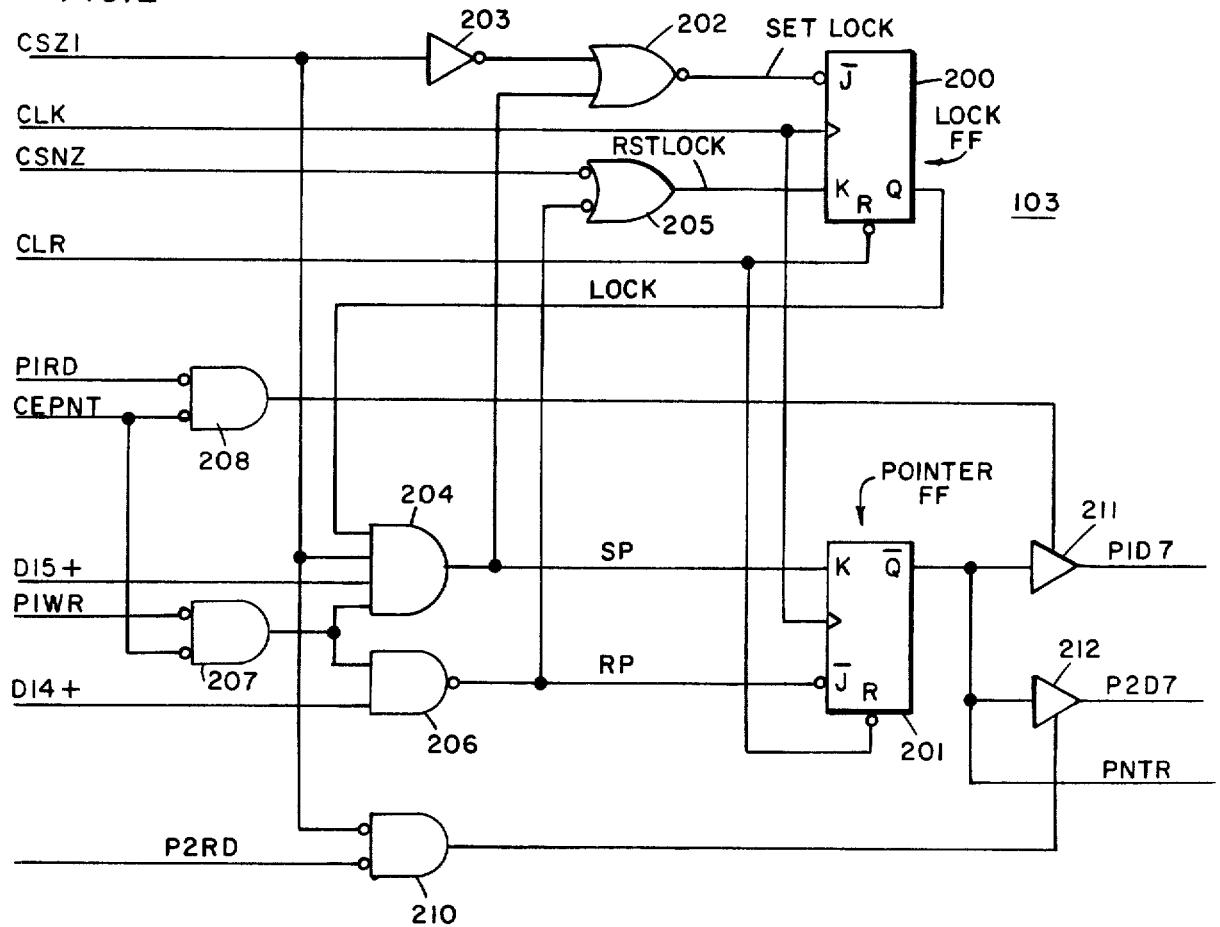
FIG. 2 is a more detailed schematic diagram of the interlock apparatus used with the invention shown in FIG. 1.

Referring now to FIG. 2, there is shown a schematic diagram of the interlock circuit 103, per se. In this circuit are included lock flip-flop 200 and pointer flip-flop 201. Each of these flip-flops is a J-K flip-flop with the clock or toggle terminal thereof connected to receive the clock (CLK) input signal. This clock signal has the effect of toggling each of the flip-flops at a specified clock rate or frequency. The clock signal triggers the J-K flip-flop so that the input signals supplied thereto are transferred to the output terminal Q in response to the toggling of the respective flip-flop.

In addition, the reset terminal R of each of the flip-flops is connected to receive the system clear signal CLR which is used to clear the flip-flop (or the entire circuit) at a specified time such as during start up or the like.

The J̄ input terminal of flip-flop 200 is connected to the output of NOR gate 202. One input of gate 202 is connected to the output terminal of inverter 203. The input of inverter 203 receives the signal CSZ1 which is provided by processor P2. The other input of NOR gate 202 is connected to the output of AND gate 204 which has one input thereof connected to receive the P2 set signal CSZ1- noted above. Another input to gate 204 is supplied by the output terminal Q of flip-flop 200.

The K input terminal of flip-flop 200 is connected to the output of NAND gate 205 which has one input terminal thereof connected to receive the P2 reset signal CSNZ-. The other input terminal of gate 205 is connected to the output terminal of NAND gate 206. One input terminal of gate 206 is connected to receive input signal D14 which represents the release signal from data bus DB1 or processor P1. The other input terminal of gate 206 is connected to an input terminal of gate 204 and to the output terminal of NOR gate 207. One input terminal of gate 207 is connected to the P1 write signal P1WR while the other input terminal of gate 207 is connected to the select input of NOR gate 208 to receive the input signal CEPNT which is the address decode signal supplied by processor P1. In addition, the processor P1 read signal P1RD is supplied to another input of gate 208.

The output terminals of gates 204 and 206 are connected to supply input signals respectively to gates 202 and 205 as noted above, and as well, to the input terminals K and J̄ of pointer flip-flop 201. The output terminal Q of flip-flop 201 is connected to the input terminals of tristable gates 211 and 212. The select terminal of gate 211 is connected to the output terminal of gate 208 while the select terminal of gate 212 is connected to the output terminal of gate 210. The output terminals of gates 211 and 212 produce the output signals D1 and D2 which are connected to the data busses DB1 and DB2, respectively, to indicate to the respective processors P1 and P2 whether control of the interlock circuit is established.

In addition, the output terminal Q of pointer flip-flop 201 provides the pointer output signal PNTR which is connected to MUX 101 (see FIG. 1) to direct the operation of MUX 101 and, therefore, the interconnection of memory 100 with the appropriate processor P1 and P2. Copending application Ser. No. 06/220,299, filed on Dec. 27, 1980, entitled DUAL PORT EXCHANGE MEMORY BETWEEN MULTIPLE MICROPROCESSORS, by Ralph L. Adcock, is incorporated herein by reference for further discussion of one application of the instant invention.

In describing the operation of the interlock circuit 103 of FIG. 2, it is initially assumed that processor P2 has priority (i.e. the normal condition) and processor P1 is not seeking to obtain control of the interlock circuit. In this situation, the input signal CSZ1- from the processor P2 is a low-level signal to represent that processor P2 is selecting the lock and pointer. That is, signal CSZ1- is the decoded signal of the processor P2 address bits. CSNZ- is a signal used by processor P2 to unlock the lock flip-flop and is pulsed low when P2 has completed its use of the exchange memory and wishes to give up control. At the same time, the processor P1 address decode signal CEPNT- is a high-level signal produced by processor P1 and indicates that processor P1 is not selecting. The high-level signal CEPNT- is applied to inputs of NOR gates 207 and 208. Each of these gates produces a low-level output signal in response to the high-level input signal. The low-level signal from gate 208 is unable to activate tristate gate 211. The low-level signal from gate 207 is supplied as one input to AND gate 204 and, effectively, disables this gate so that gate 204 produces a low-level output signal SP. The low-level signal from gate 207 is, however, operative to cause NAND gate 206 to produce a high-level output signal RP which is supplied to the J input of flip-flop 201 and to an input of NAND gate 205. The signals applied to flip-flop 201 cause the signal Q to be a low-level signal (upon application of a clock signal CLK.)

At the same time, inverter 203 inverts the low-level input signal CSZ1- and produces a high-level output which is supplied to an input terminal of the NOR gate 202. The other input to NOR gate 202 is a low-level signal inasmuch as the low-level CSZ1- is also applied to AND gate 204. In response to a high-level input signal, NOR gate 202 produces a low-level output signal which is supplied to the $\overline{J}$ input terminal of flip-flop 200. Inasmuch as the input signal CSNZ- is a high-level signal, the operation of gate 205 is determined by NAND gate 206. This gate receives a low-level input signal D14+ which indicates that processor P2 is in control of the interlock. Also, signal CEPNT- is a high-level signal, as noted, wherein gate 207 produces a low-level signal thereby forcing gate 206 to produce the high-level RP signal as described above. Consequently, the NAND gate 205 receives two high-level input signals and, therefore, produces a low-level signal at the K input terminal of lock flip-flop 200. Consequently, the Q output terminal of flip-flop 200 produces a low level output signal which is supplied to an input of AND gate 204. This forces the output SP of AND gate 204 low which is returned to the NOR gate 202 thereby effectively locking the operation of lock flip-flop 200.

In addition, the low output signal SP of the AND gate 204 is connected to the K input terminal of pointer flip-flop 201. The signal RP is determined to be a high-level signal (see above).

When the clock signal (CLK) is applied, flip-flop 201 produces a low-level output signal $\overline{Q}$. This signal is applied to tristate gates 211 and 212. As noted above, gate 211 is not enabled by the signal from gate 208. On the other hand, gate 210 receives the low-level signals CSZ1- and P2RD. Gate 210 therefore, produces a high-level signal which activates gate 212 to produce the low-level signal P2D7. This latter signal is supplied to processor P2 to indicate that the pointer signal PNTR is directed to processor P2 to thereby indicate that processor P2 has control of the interlock circuit and the information on data bus DB2 is activated.

Assuming now that processor P1 wishes to take control of the interlock circuit, a high-level signal is supplied at terminal D15+ and a low-level signal is supplied at the terminal P1WR- and the signal CEPNT- becomes a low-level. The D15+ signal has no initial effect on AND gate 204 inasmuch as lock flip-flop 200 continues to block or disable the AND gate. However, the P1WR- and the CEPNT- signals are supplied to NOR gate 207 and cause the NOR gate to supply a high-level output signal to gate 204. If now processor P2 is not seeking to control the interlock signal CSZ1- will be high and signal CSNZ- will be low (i.e. processor P2 is willing to give up control). The high-level CSZ1- signal is supplied to gate 204 and, via inverter 203, to gate 202. As a result, gate 202 produces a high-level output which is applied to the $\overline{J}$ input of flip-flop 200. Also, the low-level signal CSNZ- causes gate 205 to produce a high-level signal. With the next clock pulse CLK, flip-flop 200 produces a high-level output signal $\overline{Q}$ which indicates an unlocked condition. That is, the high-level Q signal is supplied to gate 204 which now produces a high-level signal which is supplied to gate 202 and to the K input of flip-flop 201. At the next clock signal CLK, flip-flop 201 produces a high-level signal $\overline{Q}$ which is supplied to gates 211 and 212. In this instance, the output of gate 210 is low (CSZ1- is high), therefore, gate 212 is disabled. However, gate 208 is enabled by the low-level signal CEPNT-. Therefore, with the application of the low-level signal P1RD-, gate 208 produces a high-level signal which enables gate 211. Therefore, the signal P1D7 is applied to processor P1 to show that processor P1 is in control and processor P2 stays off the interlock bus. Thus, in practice, the signal P1WR- is applied by processor P1 to "write a 1" when processor P1 seeks control of the interlock circuit. The signal P1RD is applied to "read if the 1 was written". If so, processor P1 has control; if not, processor P2 is still in control.

When processor P1 is concluded, the signal D14+ is activated and produces a high-level signal at the input of NAND gate 206. This signal, together with the signal from the NOR gate 207, produces a high-level RP signal at the $\overline{J}$ input of flip-flop 201 and, as well, at an input of NAND gate 205. If CSNZ- has gone high (processor P2 wants control), NAND gate 205 produces a low-level signal at the K input terminal of lock flip-flop 200. This "reset lock" signal, in conjunction with the low signal at the $\overline{J}$ input of flip-flop 200, produces a low-level signal at the $\overline{Q}$ output of flip-flop 200 wherein the lock flip-flop is returned to the original condition ready for the processor P2 to take control again.

It should be noted that if processor P2 is not ready to take control at this time, the system is still "released" to processor P2 inasmuch as the pulse signals D15+, P1RD and P1WR- have returned to the high-level and the lock flip-flop 200 is locked again. However, if processor P1 again tried to take control and processor P2 has not taken control, processor P1 can take over as described above.

Thus, there has been shown and described a new and unique circuit for permitting two independent processor circuits to use a common exchange memory with separate busses, to intercommunicate with each other and the like without any deleterious effect on the information or processing of the other. While specific types of logic and circuitry have been described, it is clear that modifications can be made thereto without departing from the spirit of the invention. Any such modifications which fall within the purview of this description are intended to be included therein as well. The specific embodiment is illustrative only, not limitative. The scope of the invention is limited only by the claims appended hereto.

Having thus described a preferred embodiment of the invention, what is claimed is:

1. A computing system comprising
   first (P1) processor means,
   second (P2) processor means,
   switching means (101),
   first bus means (DB1) connected to selectively transfer signals between said first processor means and said switching means,
   second bus means (DB2) connected to selectively transfer signals between said second processor means and said switching means,
   memory means (100) connected to receive signals from said switching means, and interlock means (103) connected to said switching means to determine which one of said first and second processor means is to be connected to said memory means via said switching means and assuring that only one processor means is so connected at any time, said interlock means operative to normally maintain a priority status for said second processor means but selectively permitting either of said signal processor means to be connected to said switching means for consecutive operations thereof at the direction of said first and second processor means, said interlock means produces a signal (P2D7) wherein said second processor means has said priority status and is normally connected to said memory means via said switching means in response to a control signal (CSZ1) from said second processor means and wherein said first processor means is connected to said memory means via said switching means only when said second processor is not so connected, said interlock means includes first and second bistable means, said first bistable means (200) connected to receive signals from said second processor means to produce signals representative of the status of said second processor means and to selectively prevent said first processor means from being connected to said switching means, said second bistable means (201) connected to receive signals from said first and second processor means and to supply signals (PNTR) to said switching means to control which of said first and second processor means is connected to said memory means as well as to supply signals (P1D7, P2D7) to said first and second processor means to indicate whether the connection of the respective processor means has been permitted, said second bistable means further connected to receive signals from said first bistable means to thereby produce signals which selectively preclude one of said first and second processor means from being connected to said memory means via said switching means, said second bistable means connected to receive an inquiry signal from said first processor means when said first processor means attempts to be connected to said memory means via said switching means and to produce an output signal in response to said inquiry signal which output signal informs said first processor means if it has obtained control.

2. The computing system recited in claim 1 wherein, said inquiry signal is a "true" signal which said one processor attempts to write into the interlock means and thereby alter an output signal produced by said interlock means, and said output signal which is read by said one processor is a "true" signal when said one processor has obtained control over said computing system and is a "false" signal when said one processor has not obtained control over said computing system.

3. The computing system recited in claim 1 wherein, said interlock means produces a signal wherein one of said first and second processor means has priority and is normally connected to said memory means via said switching means in response to a control signal from said one processor means and wherein the other one of said first and second processor means is connected to said memory means via said switching means only when said one processor is not so connected.

4. The computing system recited in claim 1 including, gate means for supplying a signal to said first bistable means to unlock said first bistable means when said one processor means is not actively connected to said memory means via said switching means.

5. The computing system recited in claim 1 wherein, said other one of said processor means selectively supplies a signal to said interlock circuit means to indicate that said other one of said processor means is concluded and returns the interlock circuit means to the original condition so that said one processor has control.

* * * * *